(12) United States Patent
Carroll

(10) Patent No.: US 9,356,463 B2
(45) Date of Patent: May 31, 2016

(54) POWER CHARGING SYSTEM

(71) Applicant: Min Carroll, Montgomery, IL (US)

(72) Inventor: Min Carroll, Montgomery, IL (US)

( * ) Notice: Subject to any disclaimer, the term of this patent is extended or adjusted under 35 U.S.C. 154(b) by 374 days.

(21) Appl. No.: 13/803,897

(22) Filed: Mar. 14, 2013

(65) Prior Publication Data

US 2013/0214722 A1    Aug. 22, 2013

(51) Int. Cl.
*H02J 7/00* (2006.01)
*H02J 7/35* (2006.01)

(52) U.S. Cl.
CPC .. *H02J 7/007* (2013.01); *H02J 7/35* (2013.01)

(58) Field of Classification Search
None
See application file for complete search history.

(56) References Cited

U.S. PATENT DOCUMENTS

| | | | | |
|---|---|---|---|---|
| 3,205,422 A | * | 9/1965 | Gold | 320/163 |
| 3,970,913 A | * | 7/1976 | Heindl | 320/143 |
| 4,164,698 A | * | 8/1979 | Kleeberg | 320/101 |
| 7,990,110 B2 | | 8/2011 | Bedini | |
| 2005/0258805 A1 | * | 11/2005 | Thomas | H02H 9/042 320/134 |
| 2009/0284217 A1 | * | 11/2009 | Lin | 320/102 |
| 2011/0156641 A1 | | 6/2011 | Kishiyama et al. | |
| 2013/0026974 A1 | | 1/2013 | Huang | |
| 2013/0043841 A1 | | 2/2013 | Wei | |
| 2013/0093380 A1 | * | 4/2013 | Gallert | H01M 10/465 320/102 |

FOREIGN PATENT DOCUMENTS

| | | | | | |
|---|---|---|---|---|---|
| FR | EP 0039280 A1 | * | 11/1981 | | H02H 3/332 |
| JP | 04-138033 | * | 5/1992 | | |
| SE | WO 7901061 A1 | * | 12/1979 | | H01M 10/44 |
| SE | WO7901061 A1 | * | 12/1979 | | |

* cited by examiner

Primary Examiner — Charlie Y Peng

(57) ABSTRACT

Power charging system using sun energy or AC source suitable for wide range of applications such as charging electric vehicle battery or battery pack and/or supplying electricity for commercial, industrial and/or residential customers; the system comprises wide variety of relay and other components to manipulate the charging states. The system's circuits include a battery charging circuit, a control circuit and a reset control circuit for a relay requires redirected polarity of the control element(s) to change the closed state/position to open state/position to charge the power storage. The power charging system also including a battery charging circuit and a control circuit to which a relay is required unidirectional pulse input; there is no need to redirect polarities of the positive terminal of the control element to change the closed state/position to open state/position to charge the power storage.

12 Claims, 3 Drawing Sheets

US 9,356,463 B2

POWER CHARGING SYSTEM

BACKGROUND OF THE INVENTION

This invention relates using solar energy or alternate current/AC to store electricity in power storage such as rechargeable battery or battery pack/bank, specifically this invention uses for charging electric vehicle or supplying the electricity for commercial, industrial and/or residential applications. The present invention can be dramatically extended both the solar panel/PV system or AC source and rechargeable battery or rechargeable battery pack/bank lifetime.

The prior arts showing there are rechargeable batteries or battery packs charged by solar panel/PV system or AC power. But the charging system has not considerably suited for wide range customers or the charging system had leaking power from power source to power storage after the power storage reached its full capacity which is not protected the power sources such as solar panel/PV system as well as AC power source and the rechargeable battery or battery pack.

This invention suitable wide range customers to use renewable energy in user friendly condition and is enabling power source such as solar panel/PV system and AC power and power storage such as rechargeable battery or battery pack/bank being use longer period of time. The solar power charging system can be used for commercial, industrial and/or residential customers. For example, the charging system can be used for electric vehicles, hybrid electric vehicles for individuals or commercial charging station. And also the system can be used for electric power supply for family, office or facility.

BRIEF DESCRIPTION OF THE DRAWING

FIG. 1A is a diagram for control elements.

FIG. 2A is a diagram for substitution of a switch.

FIG. 2B is a diagram for control elements.

DETAIL DESCRIPTION OF THE INVENTION

Figure 1:
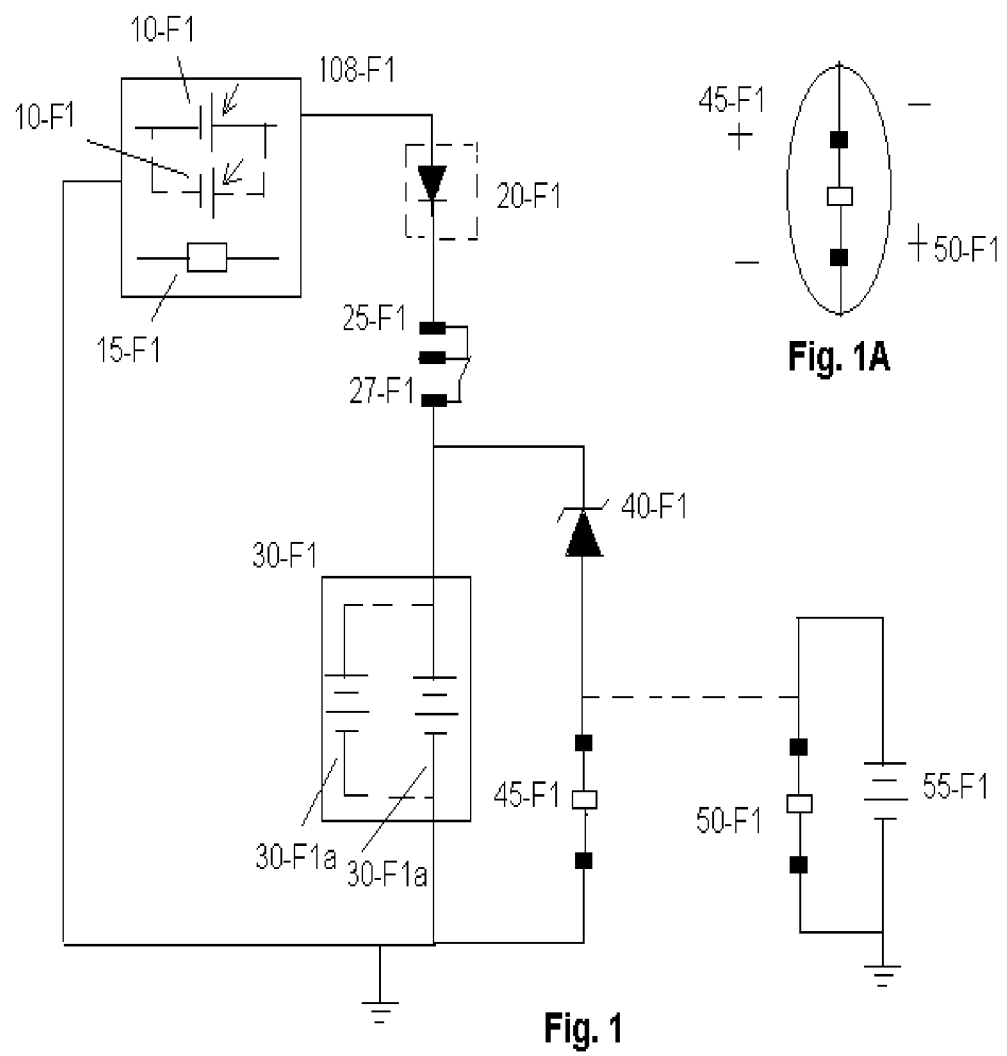
FIG. 1 is a block diagram of (a) a battery charging circuit with at least one pair of contact/terminal of load portion of a relay, (b) a control circuit including at least one power storage with control portion of the relay, (c) a reset control circuit with additional control portion of the relay.

Referring to FIG. 1, according to present invention, the power charging system have wide range of usages that suit for charging electric vehicle battery or battery pack and also this system can be used for supplying the electricity for commercial, industrial and/or residential applications, the system comprising a charging circuit including a power source 108-F1 connected in parallel to at least one pair of normally closed state/position terminal 1/contact1/25-F1 and a terminal2/contact2/27-F1 which are in load portion of a relay that can be sub-classified as magnetic, mechanical or impulse sequencing controlled relay, but the sub-classified relays have similar functionalities which each of the relays can be used for charging at least one power storage 30-F1 that includes at least one rechargeable battery or rechargeable battery pack/bank 30-F1a. The power source108-F1 includes at least one solar panel 10-F1 which uses sun power charging the at least one power source 30-F1. The power charging system can be used alternate current/AC as a power source which uses at least one inverter 15-F1 to convert alternate current to direct current/DC for charging the power storage 30-F1. The charging circuit further includes at least one diode 20-F1 which is for anti-reversed power flowing from the at least one power storage 30-F1 to the power source 108-F1 if the power storage has not installed with the anti-reversing diode.

A control circuit including a maximum charging voltage that is determined by at least one power storage 30-F1 that including at least one battery or at least one battery pack/bank 30-F1a, the battery manufacture has data showing this. The control circuit including a maximum charging voltage that is determined by at least one power storage 30-F1 connected in parallel to a zener diode 40-F1 and a control element1/45-F1 which is in control portion of the relay. When the voltage across the control element 1/45-F1 and the zener diode 40-F1 combined a value of the voltage is substantially equal to the maximum charging voltage of the at least one power storage 30-F1, and simultaneously reaches a minimum switching voltage of the control element1/45-F1, the at least one pair of the closed terminal 1/contact1/25-F1 and a terminal 2/contact2/27-F1 in load portion of the relay disconnected from each other, and maintained open state/set position until redirected signal or commanded or a pulsed input to change the open state/set position to a reset the closed state/position, which is disconnected the at least one power source 108-F1 from the at least one power storage 30-F1. The redirected signal or commanded or a pulsed input has similar effect to the control element1/45-F1 and the terminal 1/contact1/25-F1 and the terminal 2/contact2/27-F1 of the relay.

A reset control circuit including an electric supply 55-F1 connected in parallel to a second control element2/50-F1, when the electric supply inputs a pulse voltage or redirected signal or commanded to the second control element 2/50-F1 that resets the at least one pair of the terminal 1/contact1 and terminal 2/contact2 in closed state/position, which is reconnected the at least one power source 108-F1 to the at least one power storage 30-F1.

Referring to FIG. 1A, the control element1/45-F1 and the second control element 2/50-F1 can substitute for one coil, but redirected the coil from a positive to a negative to change the magnetic field, if the relay used coil as the control element1/45-F1 and control element2/50-F1. The control element1/45-F1 or control element 2/50-F1 may use other means such as a metal clip etc. to operate the control elements.

Figure 2:
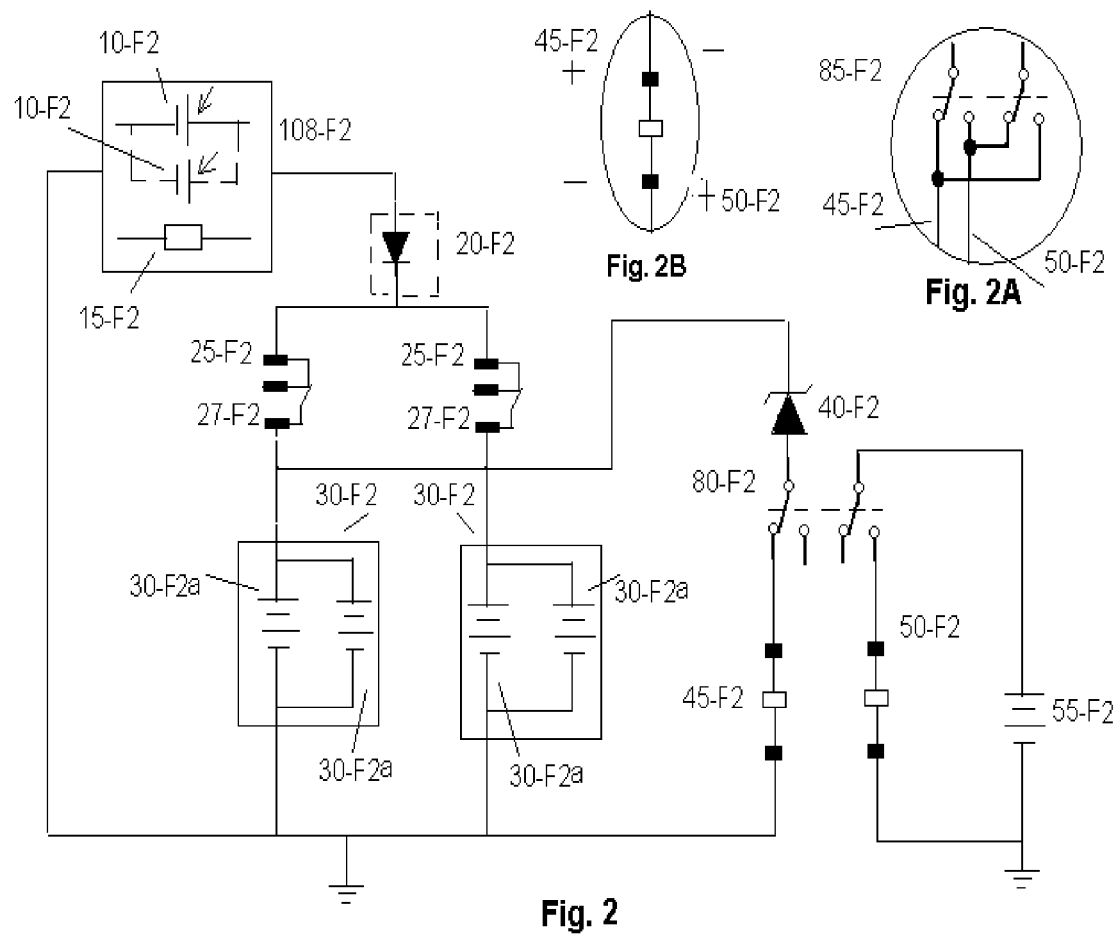
FIG. 2 is enhancement and improvement of a block diagram based on FIG. 1 which includes (a) a battery charging circuit with additional contacts/terminals of a relay, (b) a control circuit for additional storages, (c) a reset control circuit.

FIG. 2 is an embodiment of an enhancement or improvement of power charging system designed for charging electric vehicle battery or battery pack and also the system can be used for supplying the electricity for commercial, industrial and/or residential applications, the system comprising a charging circuit including at least one power source 108-F2 connected in parallel to at least one pair of normally closed terminal3/contact3/25-F2 and a terminal4/contact4/27-F2 which are in load portion of a relay that can be sub-classified as magnetic, mechanical or impulse sequencing controlled the relay, but the sub-classified relays have similar functionalities which each of the relays can be used for charging at least one power storage 30-F2 including at least one rechargeable battery or rechargeable battery pack/bank 30-F2a. The power source108-F2 including at least one solar panel 10-F2 and 10-F2 which uses sun power charging at least one power storage 30-F2 including at least one rechargeable battery or at least one rechargeable battery pack/bank 30-F2a. The power charging system can be used a regular alternate current/AC as a power source which uses an inverter 15-F2 to convert alternate current to direct current/DC for charging the rechargeable battery or rechargeable battery pack/bank. Since the power charging system can be charged more than one power storage 30-F2, this feature enhances the power charging system's capability which can be used for commercial and industrial applications not just residential application.

A control circuit including a maximum charging voltage that is determined by at least one power storage 30-F2 includes at least one rechargeable battery or at least one rechargeable battery pack/bank 30-F2a. The battery manufacture has data showing this. The control circuit including at least one power storage 30-F2 connected in parallel to a zener diode 40-F2, a switch 80-F2, and a control element3/45-F2 which is in control portion of the relay. When the voltage across in series to the zener diode 40-F2, the switch 80-F2 and the control element3/45-F2 combined a value of the voltage is substantially equal to the maximum charging voltage of the at least one power storage 30-F2, and almost simultaneously reaches a minimum switching voltage of the control element 3/45-F2 and a minimum switch voltage of the switch 80-F2, the at least one pair of the normally closed terminal3/contact3/25-F2 and terminal4/contact4/27-F2 in load portion of the relay disconnected from each other respectively, and maintained open state/set position until redirected signal or commanded or a pulsed input to change the open state/set position to a reset closed state/position, that disconnected the power source 108-F2 from the at least one power storage 30-F2. The redirected signal or commanded or a pulsed input has similar effect to control the terminals/contacts 25-F2 and 27-F2 of the relay. The charging circuit further includes at least one diode 20-F2 which is for anti-reversed power flowing from the at least one power storage 30-F2 to the power source 108-F2 if the power storage has not installed with the anti-reversing diode.

A reset control circuit including an electric supply 55-F2 connected in parallel to a switch 80-F2 and a control element4/50-F2, when the switch 80-F2 moves to close position connected to the electric supply that inputs a pulse voltage or redirected signal or commanded to the control element4/50-F2 that resets the at least one pair of the terminal 3/contact3 and terminal4/contact4 in closed state/position, which is reconnected the at least one power source 108-F2 to the at least one power storage 30-F2.

Referring to FIG. 2A, the switch 80-F2 can be a double pole double throw switch or an on-off-on switch or a double pole center off switch 85-F2 used for removing the set closed state/position to reset open state/position which is convenient for users. The switch also can be used for replacing the at least one power storage 30-F2 after it charged in full capacity of power.

Referring to FIG. 2B, the control element3/45-F2 and the control element4/50-F2 can substitute for one coil, but redirected the coil from a positive to a negative to change the magnetic field if the relay used coil as the control element3/45-F2 and control element4/50-F2. The control element3/45-F2 or control element4/50-F2 may use other means such as a metal clip etc. to operate the control elements.

Figure 3:
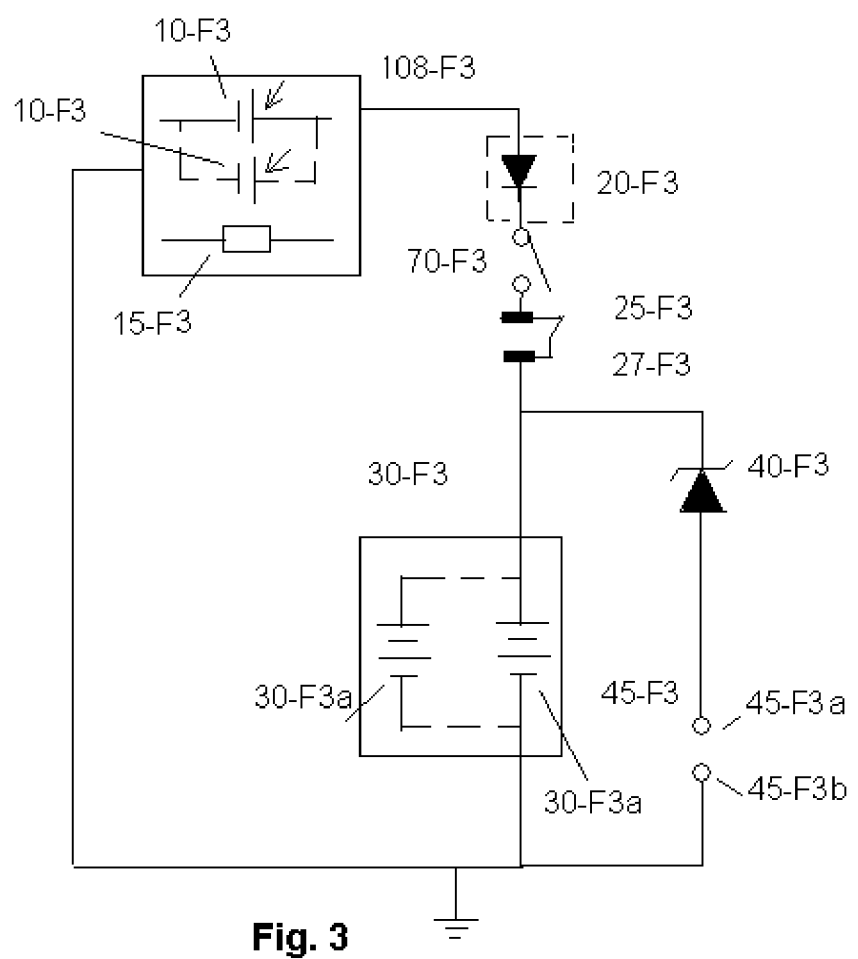
FIG. 3 is a block diagram uses different kind relay that includes (a) a battery charging circuit, (b) a control circuit for at least one power storage.

Referring to FIG. 3, an embodiment of a power charging system designed for charging electric vehicle battery or battery pack and also the system can be used for supplying the electricity for commercial, industrial and/or residential applications, the system comprising a charging circuit having at least one power source 108-F3 connected in parallel to at least one pair of normally closed state/position terminal5/contact5/25-F3 and a terminal6/contact6/27-F3 which are in load portion of a relay. The at least one power source108-F3 includes at least one solar panel 10-F3 which uses sun power charging at lease one power storage 30-F3 that includes at least one rechargeable battery or at least one rechargeable battery pack/bank 30-F3a. Alternate current/AC can be used as a power source for power charging system which uses at least one inverter 15-F3 to convert alternate current to direct current/DC for charging the at least one power storage 30-F3. At least one switch 70-F3 may connect between the at least one power source 108-F3 and at least one pair of closed state/position terminal5/contact5/25-F3 and the terminal6/contact6/27-F3 that disconnected the at least one power storage 30-F3 from the at least one power source 108-F3 in the charging circuit. The switch 70-F3 also can be used for replacing the at least one power storage 30-F3 after it charged in full capacity of power.

A control circuit including a maximum charging voltage that is determined by at least one power storage 30-F3 that includes at least one rechargeable battery or at least one rechargeable battery pack/bank 30-F3a, the battery manufacture has data showing this. The control circuit including at least one power storage 30-F3 connected in parallel to a zener diode 40-F3 and a control element5/45-F3 which is in control portion of the relay. When the voltage across the control element5/45-F3 including a positive terminal 45-F3a and a negative terminal 45-F3b and the zener diode 40-F3, in the meantime, a value of the voltage is substantially equal to the maximum charging voltage of the at least one power storage 30-F3 and simultaneously reaches a minimum switching voltage of the control element 5/45-F3, the at least one pair of closed state/position terminal 5/contact5/25-F3 and terminal 6/contact6/27-F3 in load portion of the relay disconnected from each other, which is disconnected the at least one power source 108-F3 from the at least one power storage 30-F3. The relay in FIG. 3 of the embodiment is required unidirectional pulse input. There is no need to redirect polarities of the positive terminal 45-F3a and 45-F3b of the control element5/45-F3 to change the closed state/position to open state/position.

The figures of the drawing are for the purpose of illustration and operation of the power charging system(s); the symbolized characters representing the components in the circuits are not limited scope of present invention. Certain changes may be made in the foregoing disclosure without departing from the scope of the invention.

I claim:

1. Power charging system for electric vehicle and/or supplying electricity for commercial, industrial and/or residential applications comprising:
   (a) a charging circuit including at least one power source connected in parallel to at least one power storage, at least one pair of normally closed first terminal/contact and second terminal/contact which are in a load portion of a relay connected between the at least one power source and the at least one power storage; wherein the at least one pair of first terminal/contact and second terminal/contact are in closed state;
   (b) a control circuit including a maximum charging voltage that is determined by the at least one power storage connected in parallel to a zener diode and a first control element which is in a control portion of the relay, when a voltage across the zener diode and the first control element in serial combined a value of the voltage is substantially equal to the maximum charging voltage of the at least one power storage and simultaneously reaches a minimum switching voltage of the first control element, the at least one pair of the normally closed first terminal/contact and second terminal/contact in the load portion of the relay are disconnected from each other, and maintained in open state/set position, which disconnects the at least one power source from the at least one power storage; and (c) a reset control circuit including an electric supply and a second control element, when the electric supply inputs a pulse voltage or redirected signal or commanded to the second control element that resets the at least one pair of first terminal/contact and second terminal/contact in closed state/position which reconnects the at least one power source to the at least one power storage.

2. The power charging system of claim 1 further including an anti-power reversing diode connected in series to the at least one power source if the at least one power storage is not installed with the anti-power reversing diode.

3. The power charging system of claim 1, wherein the at least one power source includes at least one solar panel or at least one photovoltaic system if the power charging system uses sun energy as power source.

4. The power charging system of claim 1, wherein the at least one power source including at least one inverter that converts alternate current to direct current if the power charging system uses the alternate current as power source.

5. The power charging system of claim 1, wherein the at least one power storage includes at least one rechargeable battery or at least one rechargeable battery pack/bank.

6. The power charging system of claim 1, wherein the first control element and the second control element are adopted to two coils or substituted for one coil, but redirected the coil from a positive to a negative to change the magnetic field, if the first control element and the second control element use coil as the control elements.

7. Power charging system for electric vehicle and/or supplying electricity for commercial, industrial and/or residential applications comprising:

(a) a charging circuit including at least one power source connected in parallel to at least one pair of normally closed third terminal/contact and fourth terminal/contact, and at least one power storage; wherein the at least one pair of third terminal/contact and fourth terminal/contact are in a load portion of a relay with close state;

(b) a control circuit including a maximum charging voltage that is determined by the at least one power storage connected in parallel to a zener diode, a switch and a third control element which is in a control portion of the relay, when a voltage across the zener diode, the switch and the third control element in series combined a value of the voltage is substantially equal to the maximum charging voltage of the at least one power storage and simultaneously reaches a minimum switching voltage of the third control element and a minimum switching voltage of the switch, the at least one pair of the normally close third terminal/contact and fourth terminal/contact disconnected from each other respectively that is in the load portion of the relay, and maintained in open state/set position, which disconnects the at least one power source from the at least one power storage; and (c) a reset control circuit including an electric supply connected in parallel to the switch and a fourth control element, when the switch moves to closed position reconnected to the electric supply that inputs a pulse voltage or redirected signal or commanded to the fourth control element that resets the at least one pair of third terminal/contact and fourth terminal/contact in closed state/position which reconnects the at least one power source to the at least one power storage.

8. The power charging system of claim 7 further including an anti-power reversing diode connected in series to the at least one power source if the at least one power storage is not installed the anti-power reversing diode.

9. The power charging system of claim 7, wherein the at least one power source including at least one solar panel or at least one photovoltaic system, if the power charging system uses sun energy as power source.

10. The power charging system of claim 7, wherein the at least one power source including at least one inverter that converts alternate current to direct current, if the power charging system uses the alternate current as power source.

11. The power charging system of claim 7, wherein the at least one power storage includes at least one rechargeable battery or at least one rechargeable battery pack/bank.

12. The power charging system of claim 7, wherein the third control element and the fourth control element are adopted two coils or substituted for one coil, but redirected the coil from a positive to a negative to change the magnetic field, if the third control element and the fourth control element use coil as the control elements.

* * * * *